US008929387B2

(12) United States Patent
Wu et al.

(10) Patent No.: US 8,929,387 B2
(45) Date of Patent: Jan. 6, 2015

(54) COGNITIVE RADIO COMMUNICATION SYSTEM AND OPERATING METHOD THEREOF

(71) Applicant: National Chiao Tung University, Hsinchu (TW)

(72) Inventors: Sau-Hsuan Wu, New Taipei (TW); Hsi-Lu Chao, Taipei (TW); Chun-Hsien Ko, Taipei (TW); Shang-Ru Mo, Kaohsiung (TW); Chang-Ting Jiang, Taipei (TW); Tzung-Lin Li, Yunlin County (TW); Chung-Chieh Cheng, New Taipei (TW); Chiau-Feng Liang, Changhua County (TW)

(73) Assignee: National Chiao Tung University, Hsinchu (TW)

(*) Notice: Subject to any disclaimer, the term of this patent is extended or adjusted under 35 U.S.C. 154(b) by 88 days.

(21) Appl. No.: 13/779,816

(22) Filed: Feb. 28, 2013

(65) Prior Publication Data

US 2014/0241259 A1   Aug. 28, 2014

(51) Int. Cl.
*H04J 3/16* (2006.01)
*H04W 16/14* (2009.01)

(52) U.S. Cl.
CPC .................................. *H04W 16/14* (2013.01)
USPC ........................................................ 370/437

(58) Field of Classification Search
CPC ..................... H04B 2201/692; H04L 27/0006;
H04W 8/005; H04W 16/10; H04W 16/14;
H04W 16/16; H04W 24/00; H04W 72/02;
H04W 72/04; H04W 72/0453; H04W 72/12
See application file for complete search history.

(56) References Cited

U.S. PATENT DOCUMENTS

| 2008/0268892 | A1* | 10/2008 | Hamdi et al. ................. 455/522 |
| 2009/0067354 | A1* | 3/2009 | Gao et al. ...................... 370/310 |
| 2009/0149208 | A1* | 6/2009 | Huttunen et al. ............. 455/509 |
| 2009/0247201 | A1* | 10/2009 | Ye et al. ........................ 455/509 |
| 2010/0197332 | A1* | 8/2010 | Kyperountas et al. ........ 455/515 |
| 2011/0070885 | A1* | 3/2011 | Ruuska et al. ................ 455/434 |
| 2011/0286401 | A1* | 11/2011 | Wijting et al. ................ 370/329 |

OTHER PUBLICATIONS

Chun-Hsien Ko, Hsi-Lu Chao, Sau-Hsuan Wu, Cognitive Radio Cloud Network. NCP Newsletter No. 36 Feb. 2012.

* cited by examiner

*Primary Examiner* — Yong Zhou
(74) *Attorney, Agent, or Firm* — Gottlieb, Rackman & Reisman, P.C.

(57) ABSTRACT

A cognitive radio communication network is provided. The cognitive radio communication network includes a cloud and a wireless communication network.
A communication system accessing to a backbone network is provided. The communication system includes a cloud and a wireless communication network connected to the cloud, and having a plurality of cognitive radio access points and a plurality of users, wherein the cloud performs the functions of network management, power control, and radio resource management.

20 Claims, 4 Drawing Sheets

COGNITIVE RADIO COMMUNICATION SYSTEM AND OPERATING METHOD THEREOF

FIELD

The present disclosure relates to a communication system. More particularly, it relates to a cognitive radio communication system.

BACKGROUND

In general, radio frequencies are roughly divided into two categories, namely licensed frequency bands and unlicensed frequency bands. Licensed frequency bands represent frequencies which are often tightly controlled, while unlicensed frequency bands are available for use by many entities with little or no regulation. Furthermore, unlicensed frequency bands include the so-called "industrial, scientific, and medical" (ISM) bands.

However, a concerned issue is that the unlicensed frequency bands have become quite crowded. This is due to many factors, including the rapid increase of wireless devices in the ISM bands, the explosively enlarging popularity of 802.11, or the expansion of Wi-Fi. An approach is to allow unlicensed devices to access licensed frequencies or frequency bands as long as licensed users are not engaging the licensed frequencies or frequency bands.

The spectrums or portions which are not in active use by licensed users are called white spaces and cognitive radio is one emerging technique to facilitate the use of white spaces. Moreover, cognitive radio serves to change the transmission and reception parameters to avoid interference with other devices and it often requires an efficient medium access control layer to utilize the potentially dynamic white spaces. Another concerned issue is that the conventional medium access control layer is performed in contention access mechanism and it leads to low spectrum efficiency.

There is a need to solve the above deficiencies/issues.

DETAILED DESCRIPTION

Figure 1:
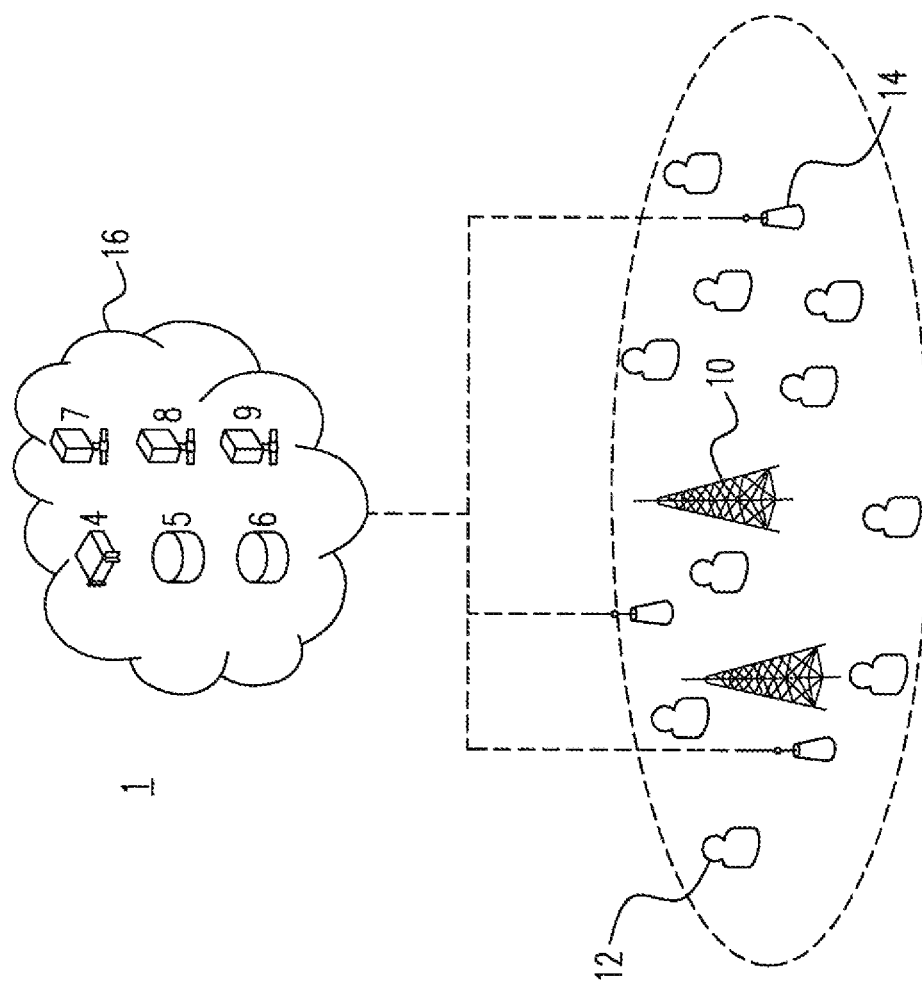
FIG. 1 is a schematic diagram illustrating a communication network in accordance with the present disclosure.

In some embodiments, various functions described above are implemented or supported by a computer program that is formed from computer readable program codes and that is embodied in a computer readable medium. The phrase "computer readable program code" includes any type of computer codes, including source codes, object codes, and executable codes. The phrase "computer readable medium" includes any type of media capable of being accessed by a computer, such as read only memory (ROM), random access memory (RAM), a hard disk drive, a compact disc (CD), a digital video disc or digital versatile disc (DVD), or any other type of media.

It may be advantageous to set forth definitions of certain words and phrases used throughout this patent document. The term "couple" and its derivatives refer to any direct or indirect communication between two or more elements, whether or not those elements are in physical contact with one another. The terms "transmit", "receive", and "communicate" as well as derivatives thereof, encompass both direct and indirect communications. The terms "include" and "comprise" as well as derivatives thereof, mean inclusion without limitation. The term "or" is inclusive, meaning and/or. The phrases "associated with" and "associated therewith" as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combinations of at least two of the same. The functionality associated with any particular controller may be centralized or distributed, whether locally or remotely.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 2:
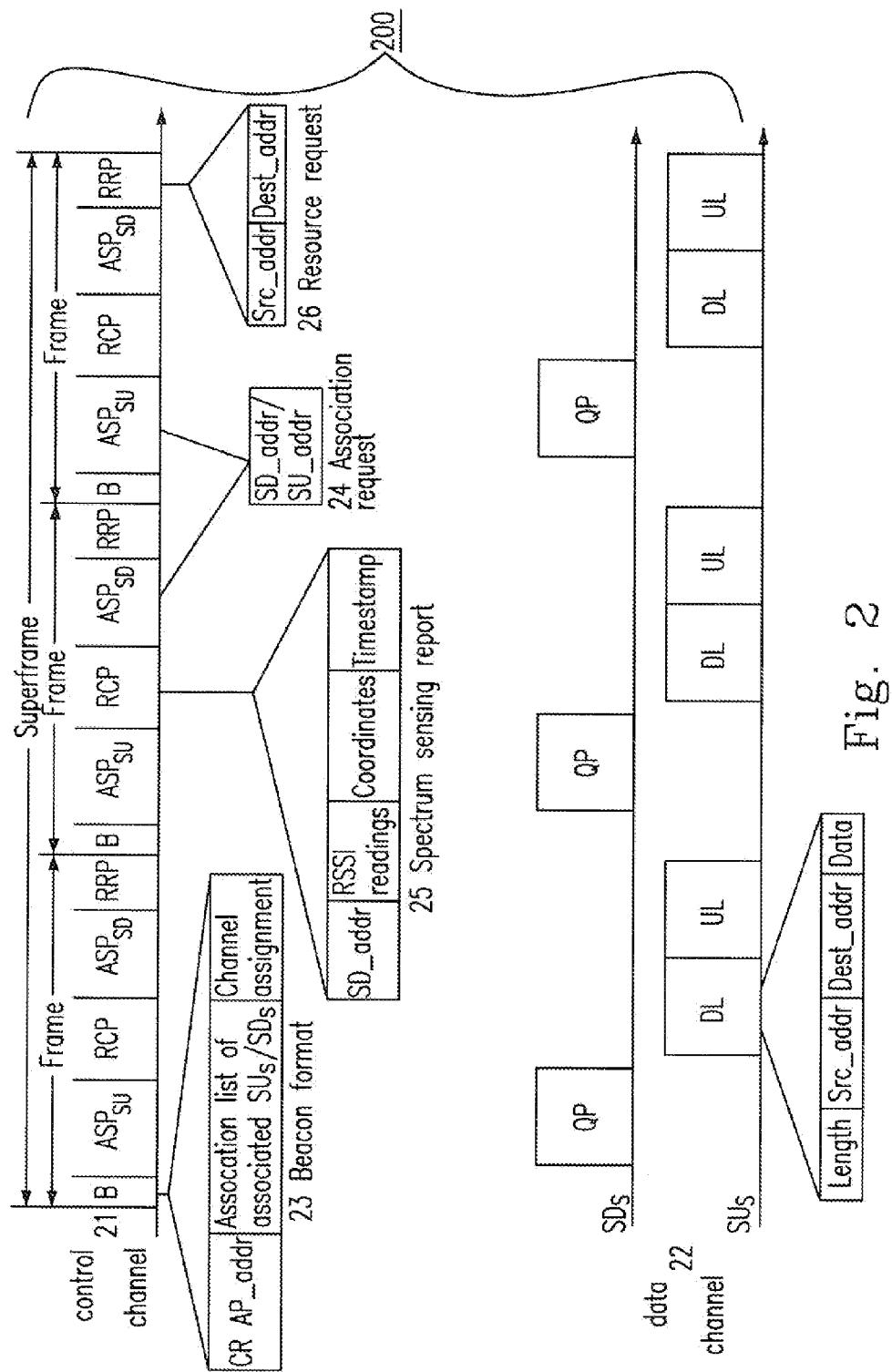
FIG. 2 is a schematic diagram illustrating the frame structure and frame formats of a medium access control (MAC) in accordance with the present disclosure.
Figure 3:
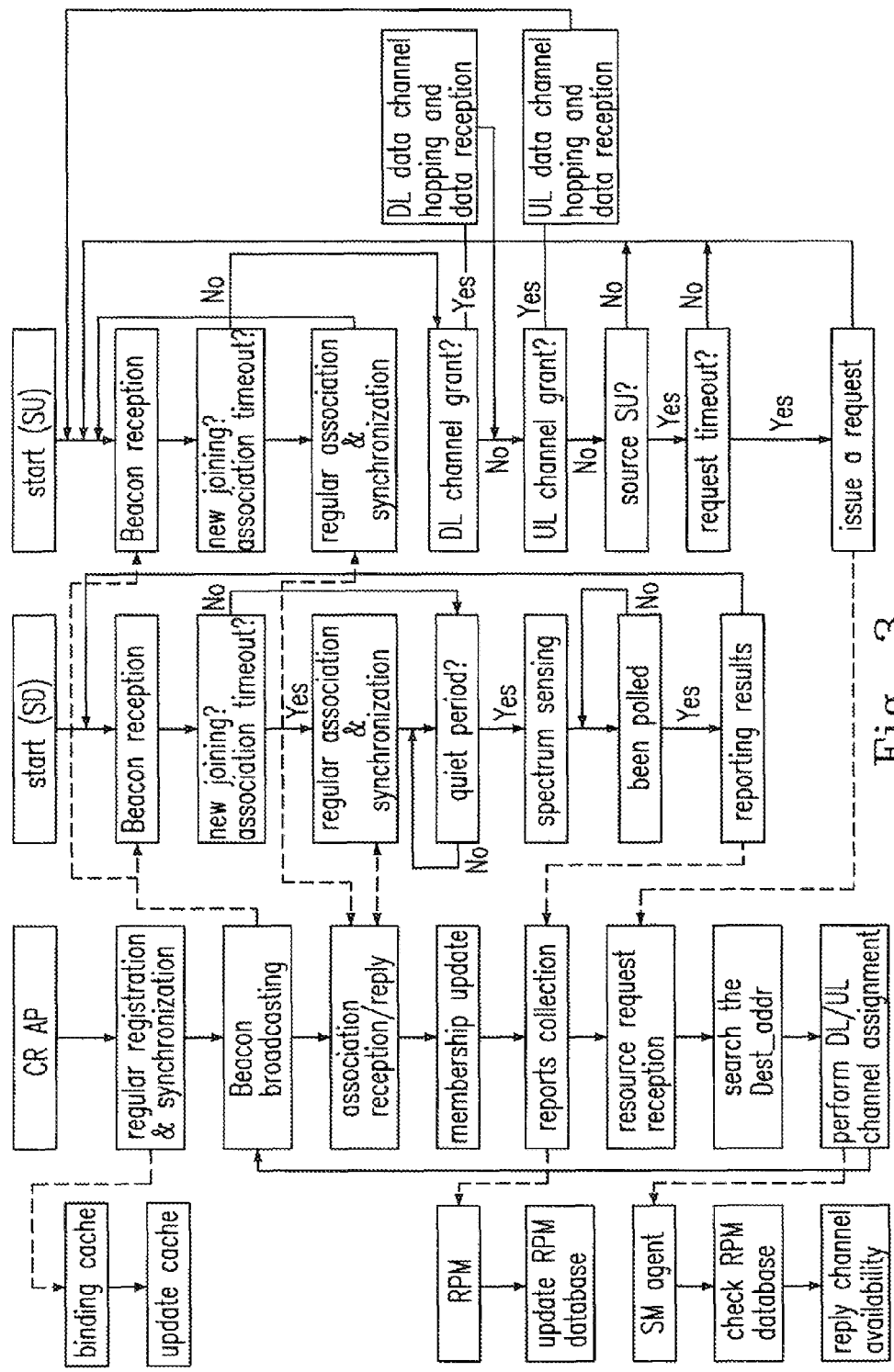
FIG. 3 is a flow chart that illustrates the procedure of a medium access control for spectrum sensing, spectrum management, and mobility management in a wireless communication network in accordance with the present disclosure.

Referring now to FIGS. 1 to 3, the first embodiment in accordance with the present disclosure is shown. FIG. 1 is a schematic diagram illustrating a communication network in accordance with the present disclosure. In FIG. 1, the communication system 1 substantially comprises a hybrid network (not shown) having a primary radio network (not shown) corresponding to the primary devices 10 and a cognitive radio network (not shown) corresponding to a cognitive radio access point (CRAP) 14. The two networks may coexist without being physically connected.

The primary radio network includes primary devices 10 serving primary users (also referred to as licensed users). The primary devices 10 provide a plurality of communication channels including a plurality of data channels for data transmission. In some embodiments, each of the primary devices 10 is a TV base station which is able to transmit TV signals through a very high frequency (VHF) band and an ultra high (UHF) band. The VHF band and the UHF band include different channels for signal transmission.

A secondary device (also referred to as a secondary user) 12 can generate sensing reports related to received signal strength, locations and channel information of the respective primary devices 10. In some embodiments, the sensing reports include the power of the primary devices 10 detected on the data channels and the locations of the secondary devices 12. The secondary devices 12 include wireless communication devices, such as smart-phones, tablet personal computers, or desktops equipped with wireless communication units that may or may not generate sensing reports automatically. The secondary devices 12 can further include at least one sensing device (not shown) that is disposed around the coverage area of the primary devices 10 for acquiring sensing reports only.

The cognitive radio network is adaptive and includes the cognitive radio access point 14 serving the cognitive radio user devices, i.e. the secondary devices 12. The cognitive radio access point 14 receives the sensing reports generated by the secondary devices 12. In some embodiments, the cognitive radio access point 14 can be disposed in different places to receive the sensing reports from the secondary devices 12 in various locations. Both the secondary devices 12 and the cognitive radio access point 14 are unauthorized users to the data channels of the primary devices 10. Accordingly, the secondary devices 12 and the cognitive radio access point 14 are able to communicate with each other through a control channel which both the secondary devices 12 and the cognitive radio access point are authorized to access, wherein the control channel is different from the data channels. In some embodiments, the control channel is in the industrial, scientific and medical (ISM) band.

In some embodiments, the data fusion center 16 includes a cooperative spectrum sensing (CSS) engine 4, a radio power map (RPM) database 5, a binding cache 6, a spectrum sensing agent 7, a spectrum management agent 8, and a home agent 9. The data fusion center 16 performs a cooperative spectrum sensing process on the sensing reports to obtain primary device information with respect to the number of primary devices, the locations, spectrum distribution and the coverage area of the primary devices 10. The U.S. application Ser. No. 13/445,930, filed on Apr. 13, 2012 and entitled as "Radio System and Operating Method of The Same" is incorporated by reference as if fully set forth herein.

FIG. 2 is a schematic diagram illustrating the frame formats of a medium access control (MAC) in accordance with the present disclosure. In FIG. 2, there is a communication network (not shown) includes a fusion center in the cloud and cognitive radio devices including a cognitive radio access point (CR AP), a sensing device (SD) and a secondary user (SU). The cognitive radio devices exchange messages over the channels, partitioned into a control channel 21 and a plurality of data channels 22, with a cloud-based cognitive radio medium access control (CR-MAC) 200. In the cloud-based CR-MAC architecture 200, on the control channel 21, a frame includes at least one time slot and a superframe consists of several frames, each frame includes a beacon, an association period for SU ($ASP_{SU}$), a report collection period (RCP), an association period for SI ($ASP_{SD}$) and a resource request period (RRP) or the like. However, on the data channel 22, each frame includes a quiet period (QP), a downlink data transmission (DL) and an uplink data transmission (UL).

The CR AP periodically broadcasts a beacon on the control channel 21, (e.g.: every time slot, 10 ms) which is monitored by the SU and the SD, to coordinate the activities on the control channel 21. The beacon format 23 includes the address of the CR AP (denoted as CR AP_addr), a list of the associated SUs and SDs, and the data channel assignments. Both the $ASP_{SU}$ and $ASP_{SD}$ are slotted, and each time slot can exactly accommodate an association request 24. An association request 24 contains the address of the SU or the SD. Subsequent to the association process, the CR AP utilizes the RCP (e.g., every time slot is 100 ms) to collect spectrum sensing reports 25, which contains the address, coordinates, and timestamp of the SD (SD_addr), and a plurality of received signal strength indicator (RSSI) readings of the data channels 22, by a polling mechanism. As to the RRP (e.g., every time slot is 140 ms), the SU sends a resource request 26, which includes the addresses of the SU (also referred to as the source SU and denoted as Src_addr) and the intended SU (also referred to as the destination SU and denoted as Dest_addr), to the CR AP.

On the data channels 22, the initial time slots are configured to make the CR AP and the SD sensing the data channels 22 synchronously, by inserting a QP which has a time duration equal to the $ASP_{SU}$ (e.g., every time slot is 50 ms). In the QP, the associated SU is forbidden to transmit data on the data channels, but a new joining SU is allowed to send an association request on the control channel 21. Furthermore, the data transmission is performed in the DL and the UL by a data frame 27 in about, e.g., 150 ms, including a packet length in byte (Length), the Src_addr, the Dest_addr, and a data payload (Data).

FIG. 3 is a flow chart illustrating a method for a medium access control in a wireless communication network in accordance with the present disclosure. In FIG. 3, a cognitive radio access point (CR AP) sends a registration request to the home agent (not shown) in the data fusion center and the home agent updates the binding cache, subsequently replying a time stamp to the CR AP. After the association and the synchronization are performed, the CR AP becomes a registered CR AP for being capable of broadcasting beacons on the control channel. When a secondary user (SU) or sensing device (SD) successfully receives a beacon, it sends an association request to the registered CR AP in at least one association period for SU ($ASP_{SU}$) if it is in an unassociated status (including new joining and association timeout). The registered CR AP maintains a list, which is periodically updated, of the associated SUs and SDs. The registered CR AP further sends a copy of the association list to the home agent for updating the binding cache. The association is successful if the ID of the corresponding SU or SD is included in the association list of the following received beacon. Otherwise, the SU (or SD) keeps sending association requests in the following $ASP_{SU}$ (or $ASP_{SD}$). Once the association is approved, the SD can start to perform spectrum sensing; the SU is able to send resource requests under the coordination of the registered CR AP.

Both the association list and the binding cache adopt a "soft-state" approach for dynamic membership maintenance. For example, the CR AP, the SU, and the SD periodically send association requests (also referred as registration requests) to refresh their membership. The corresponding entries in the association list and binding cache will be removed if no association request is received before the refresh timer is timeout.

After the association process, the SD synchronously and sequentially performs spectrum sensing to a plurality of data channels in the quiet period (QP). Subsequently, the associated SD hops back to the control channel and waits for the polling request from the registered CR AP of transmitting a spectrum sensing report in the report collection period (RCP). The CR AP forwards the gathered spectrum sensing reports to the spectrum sensing agent (not shown) in the data fusion center via an Internet backbone and the spectrum sensing agent drives the cooperative spectrum sensing engine (not shown) to derive the radio power map (RPM) and also updates the RPM database. Since SDs are deployed to perform spectrum sensing, a polling-based report collection mechanism can significantly increase the flexibility of the SD selection and the accuracy of the RPM reconstruction.

In some embodiments, when a SU (also referred to as the source SU) is associated, it needs a permission to access any one of the data channels for initiating a data communication. Accordingly, the source SU sends a resource request to its associated CR AP (also referred to as the source CR AP) in a resource request period and the source CR AP queries the SM agent in the data fusion center for an available data channel. By checking the RPM database, the SM agent allocates the available data channel to the source CR AP and the source CR AP announces the channel assignment for this uplink transmission to the source SU in the following beacon. In order to establish an end-to-end data path, the source CR AP checks its own association list to confirm the membership of the intended SU (also referred to as the destination SU). The source CR AP further announces the channel assignment for this downlink transmission to the destination SU if the confirmation is positive. Upon receiving the next beacon, both the source SU and the destination SU know the allocated data channels.

However, if the destination SU is not on the association list, which means it is not under the coordination of the source CR AP, the source CR AP queries the home agent about the CR AP (also referred to as the destination CR AP) which the destination SU associates to. Subsequent to receiving the address of the destination CR AP, the data frames are delivered to the destination SU through the destination CR AP. If the destination SU is unknown to the home agent, the source CR AP will turn down the request from the source SU.

Figure 4:
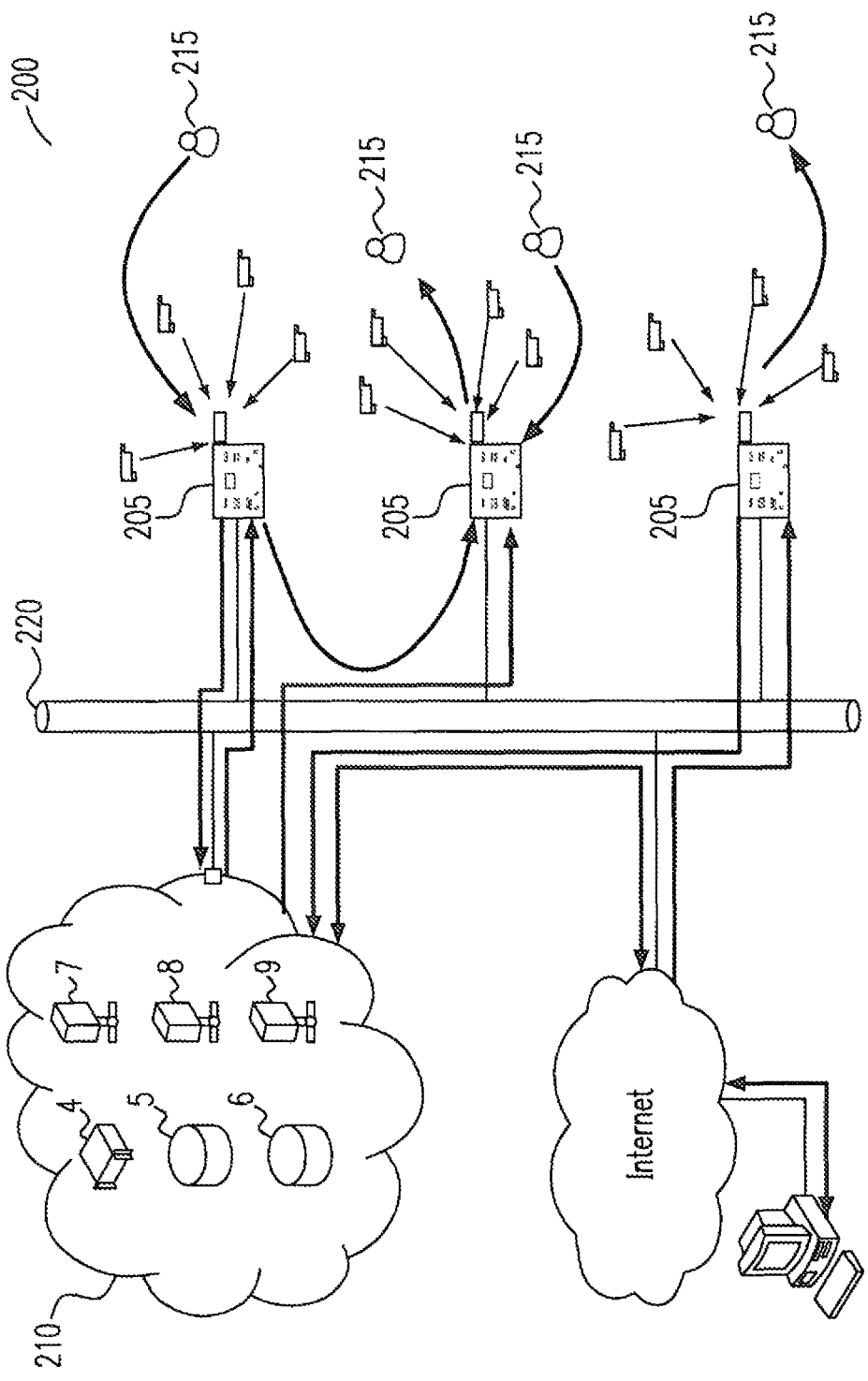
FIG. 4 is a schematic diagram illustrating a cognitive radio communication networking model in accordance with the present disclosure.

Referring now to FIG. 4, the second embodiment in accordance with the present disclosure is shown. FIG. 4 is a schematic diagram illustrating a cognitive radio communication network in accordance with the present disclosure. In FIG. 4, a cognitive cloud-radio access network (CC-RAN) model 200 for a metropolitan area network (MAN) is provided. Inside the CC-RAN model 200, CR APs 205 are distributed in a metropolitan area. The service range of a CR AP 205 is similar to that of a typical IEEE 802.11 AP or a femtocell. The CR APs 205 are connected to a cognitive radio cloud (CRC) 210 via an Ethernet 220. CR users 215 inside the service range of a CR AP 205 firstly get associated with the AP 205 by sending channel access requests. After updating its association list, the CR AP 205 further forwards this binding information to the home agent 9 of the CRC 210. In some embodiments, the CR users 215 can provide their geographical locations to the CRC 210 or the CRC 210 can estimate the CR users' locations by using some positioning methods.

The service area of a CR AP 205 is partitioned into, e.g. 12, sectors with, e.g. 4, inner sectors and, e.g. 8, outer sectors. The channel access requests issued inside a sector are lumped together and transformed into physical channel requests of different QoS levels. The numbers of channel requests of a CR AP 205 are sent to a spectrum management agent 8 of the CRC, wherein each request is associated with its QoS level, sector number and AP identification (ID).

The CR APs 205 inside the service area of CC-RAN model 200 are partitioned into a number of layers. The number of CR APs 205 deployed in a certain district of the service area is determined based on the statistics of its local mobile bandwidth requirement and traffic density. To manage the data traffics with a common but scalable mechanism in different districts and in different times of a day, the densities of CR APs 205 of different layers may be kept the same, and the number of available channels assigned to a layer may also be made the same. In some embodiments, the radio frequencies, or the TV channels, used in different districts of a layer is not the same. Under this network architecture, local districts with higher spectrum resource demands can be deployed more layers of CR APs 205. The number of active layers in different districts can be dynamically adjusted according to the data traffic loading in different times of a day. In addition, this network architecture can also utilize a realtime channel and power allocation (CPA) mechanism for each layer to improve the spectrum utilization and power consumption. The complexity of the adopted CPA algorithm depends on the numbers of channels, CR APs 205, and users inside a layer. To serve the purpose with a feasible manner, a CPA algorithm is proposed and employed in the CC-RAN model 200.

To distribute and balance the computational loading of CPA, the SM engine further partitions the CR APs 205 of a layer into clusters according to the channel requests and the geographical locations of the APs 205. The CR APs 205 inside a cluster are geographically neighboring to each other, and are served by a virtual machine (VM) of the CPA engine. To explore the multiuser diversity for the available channels and, in the meantime, to control the mutual interferences among adjacent APs and clusters, the channels allocated to the boundary APs of different clusters are different, while the interior APs belonging to different clusters can use the same locally available channels assigned to the layer. In some embodiments, the available channels of different boundary APs in a cluster may vary and are only parts of the channels shared by all the interior APs in that cluster. In some embodiments, the available channels of a cluster are jointly processed and allocated to its APs by the CPA algorithm running on its VM, based on the channels and QoS requests as well as the available channels and power constraints of each AP. All these factors will affect the computation time of the CPA mechanism. Taking into account the aforementioned factors, the formation of a cluster is aimed to balance the computation loads of the VMs.

In some embodiments, the channel requests from the users of a CR AP 205 are classified by their sectors and QoS requirements, and are lumped into a number of physical channel requests and sent to the CRC. The CPA algorithm transforms the QoS requirements into SINR constraints, and allocates the channels and the corresponding transmit powers according to the derived SINR constraints. This means that the channels, once allocated, will satisfy the received SINR requirements in their corresponding sectors of CR APs 205.

In some embodiments, the CR APs 205 schedule the channel access requests of their associated users onto the allocated channels on a per sector basis. The channel and user scheduling methods thus depend on the MAC protocol that coordinates the channel accesses. To support the channel access coordination, a cloud-based CR-MAC protocol for the CC-RAN model 200 is provided. More specifically, TVWS channels assigned to a CR AP 205 is partitioned into one control and multiple data channels. The control channel is for the CR AP 205 to collect sensing reports and coordinate data channel accesses; the data channels are assigned to SUs for data deliveries. Multiple SUs can be assigned to different data channels or share the same channel in a TDMA manner. SDs and SUs always listen to the control channel unless they are requested to perform channel sensing or granted to deliver data on data channels.

While the disclosure has been described in terms of what are presently considered to be the most practical and preferred embodiments, it is to be understood that the disclosure need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A communication system managing an available spectrum resource and accessing to a backbone network, comprising:
a cloud having a spectrum resource management unit and a radio access management unit; and
a wireless communication network connected to the cloud, and having a plurality of cognitive radio access points and a plurality of users, wherein the spectrum resource management unit accesses a database and distributes the available spectrum resource to the plurality of cognitive radio access points, the radio access management unit coordinates the plurality of cognitive radio access points and the plurality of users, and the cloud coordinates the plurality of cognitive radio access points to process channel requests received from the plurality of users, and uses the results fed back from the plurality of cognitive radio access points and a realtime channel and power allocation (CPA) mechanism to control the signal to interference-plus-noise ratios (SINR) for each user of the communication system.

2. The communication system according to claim 1, wherein the database is established by one of the plurality of cognitive radio access points, the plurality of users, and a cooperative spectrum sensing (CSS) Engine.

3. The communication system according to claim 1, wherein the backbone network is an Ethernet backbone.

4. The communication system according to claim 1, wherein the wireless communication network is one of a local area network, a metropolitan area network and a wide area network.

5. The communication system according to claim 1, wherein the plurality of cognitive radio access points are configured to perform one being selected from a group consisting of a spectrum sensing method, a detection of geographic information, an Internet accessing method, and a combination thereof.

6. The communication system according to claim 1, wherein the plurality of users are configured to perform one of a spectrum sensing method and a detection of geographic information.

7. The communication system according to claim 1, wherein the plurality of cognitive radio access points are configured to send a spectrum sensing report to the cloud.

8. The communication system according to claim 1, wherein the plurality of cognitive radio access points are configured to broadcast channel assignments to the plurality of users.

9. The communication system according to claim 1, wherein the wireless communication network further comprises a medium access control protocol and a plurality of channels.

10. The communication system according to claim 9, wherein the plurality of channels comprises a data channel and a control channel.

11. The communication system according to claim 10, wherein the medium access control protocol is configured for the plurality of cognitive radio access points and the plurality of users to synchronously sense the data channels, and forbid the plurality of users to transmit data on the data channels.

12. The communication system according to claim 10, wherein the medium access control protocol is configured to collect spectrum sensing reports from the plurality of users via the plurality of cognitive radio access points on the control channel.

13. The communication system according to claim 10, wherein the medium access control protocol is configured to periodically broadcast beacons on the control channel via the plurality of cognitive radio access points.

14. The communication system according to claim 10, wherein the medium access control protocol is configured to send channel access requests for the plurality of users via the plurality of cognitive radio access points on the control channel.

15. The communication system according to claim 10, wherein the control channel is implemented on an unlicensed band.

16. The communication system according to claim 10, wherein the control channel coordinates users' accesses on the data channels.

17. The communication system according to claim 1, wherein a medium access control protocol is configured by the realtime CPA mechanism to maintain the SINR for each user.

18. The communication system according to claim 1, wherein a medium access control protocol is configured by the channel scheduling on the cloud and the user scheduling on the cognitive radio access point to provide the plurality of users a plurality of differentiated qualities of services (QoS).

19. A communication system managing an available spectrum resource and accessing to a backbone network, comprising:
a cloud having a spectrum resource management unit and a radio access management unit; and
a wireless communication network connected to the cloud, and having a plurality of cognitive radio access points and a plurality of users, wherein the spectrum resource management unit accesses a database, dynamically forms a plurality of clusters, each of the plurality of clusters is selected from at least one of the plurality of cognitive radio access points, and allocates the available spectrum resource to the respective clusters, and the plurality of cognitive radio access points in the respective clusters share the available spectrum resource, the radio access management unit coordinates the plurality of cognitive radio access points and the plurality of users, and the cloud coordinates the plurality of cognitive radio access points to process channel requests received from the plurality of users, and uses the results fed back from the plurality of cognitive radio access points and a realtime channel and power allocation (CPA) mechanism to control the signal to interference-plus-noise ratios (SINR) for each user of the communication system.

20. A communication system accessing a backbone network, comprising:

a cloud; and a wireless communication network connected to the cloud, and having a plurality of cognitive radio access points and a plurality of users, wherein the cloud performs a network resource management and a radio resource management, and the cloud coordinates the plurality of cognitive radio access points to process channel requests received from the plurality of users, and uses the results fed back from the plurality of cognitive radio access points and a realtime channel and power allocation (CPA) mechanism to control the signal to interference-plus-noise ratios (SINR) for each user of the communication system.

* * * * *